(12) United States Patent
Harris (10) Patent No.: US 6,179,148 B1
(45) Date of Patent: Jan. 30, 2001

(54) FUEL CAP

(75) Inventor: Robert S. Harris, Connersville, IN (US)

(73) Assignee: Stant Manufacturing Inc., Connersville, IN (US)

( * ) Notice: Under 35 U.S.C. 154(b), the term of this patent shall be extended for 0 days.

(21) Appl. No.: 09/463,127

(22) PCT Filed: Jul. 23, 1998

(86) PCT No.: PCT/US98/15518

§ 371 Date: Jan. 19, 2000

§ 102(e) Date: Jan. 19, 2000

(87) PCT Pub. No.: WO99/05026

PCT Pub. Date: Feb. 4, 1999

Related U.S. Application Data (60) Provisional application No. 60/053,607, filed on Jul. 23, 1997.

(51) Int. Cl.[7] .................................................. B65D 41/04
(52) U.S. Cl. ................. 220/288; 220/304; 220/DIG. 33; 220/88.1
(58) Field of Search .................................. 220/288, 303, 220/304, 88.1, DIG. 33, DIG. 34, 201

(56) References Cited

U.S. PATENT DOCUMENTS

| | | | | |
|---|---|---|---|---|
| 4,065,026 | * | 12/1977 | Williams et al. | 220/DIG. 33 X |
| 4,299,102 | * | 11/1981 | Aro | 220/DIG. 33 X |
| 4,597,504 | * | 7/1986 | Witt | 220/201 |
| 5,449,086 | * | 9/1995 | Harris | 220/DIG. 33 X |
| 5,638,975 | * | 6/1997 | Harris | 220/DIG. 33 X |
| 5,996,830 | * | 12/1999 | Hagano et al. | 220/DIG. 33 X |
| 6,003,709 | * | 12/1999 | Hagano et al. | 220/DIG. 33 X |

* cited by examiner

*Primary Examiner*—Nathan J. Newhouse
(74) *Attorney, Agent, or Firm*—Barnes & Thornburg (57) ABSTRACT

A fuel cap (210) of the present invention includes a closure member (16), a handle (14) for turning closure member (16) to engage and close a filler neck (12), and a conductor (204) configured to conduct an electrical charge from handle (14) to filler neck (12) during rotation of handle relative to closure member(16) and before movement of closure member (16) to break a seal established between closure member (16) and filler neck (12). Fuel cap (210) also includes a torque-transmission race (18) to provide a lost-motion driving connection between handle (14) and closure member (16).

31 Claims, 7 Drawing Sheets

FUEL CAP

CROSS-REFERENCES TO RELATED APPLICATIONS

This application is a U.S. national application of international application serial No. PCT/US98/15518 filed Jul. 23, 1998, which claims priority to U.S. provisional application Ser. No. 60/053,607 filed Jul. 23, 1997.

The present invention relates to a fuel cap, and particularly to a fuel cap for closing a vehicle fuel tank filler neck. More particularly, the present invention relates to an electrically conductive fuel cap.

Occasionally, vehicle occupants or service station attendants will "carry" a static electricity charge having an electrical potential that is higher than the vehicle itself. A fuel cap in accordance with the present invention is configured to "ground" a person turning the fuel cap relative to the filler neck so as to dissipate to ground, in a controlled manner, any electrostatic charge or potential on the person during rotation of a cover of the fuel cap relative to a filler neck-engaging base of the fuel cap at the outset of a vehicle refueling cycle and before fuel vapor is allowed to vent through the mouth of the filler neck.

The fuel cap includes a closure, a handle for turning the closure to engage and close the filler neck, and a conductor configured to conduct an electrical charge from the handle to the filler neck during rotation of the handle relative to the closure and before movement of the closure to break a seal established between the closure and the filler neck. In preferred embodiments, the closure includes a closure member adapted to close the open mouth of the filler neck and a torque-transmission race configured to provide a lost-motion driving connection between the handle and the closure member. In one embodiment, the conductor includes a conductor pin mounted on the closure member and arranged to contact the filler neck and a conductor ring arranged to move relative to the closure member and the torque-transmission race and contact the conductor pin before the closure member is moved to open the filler neck. In another embodiment, the conductor includes an annular band coupled to the torque-transmission race to rotate therewith and a finger appended to the annular band and arranged to be moved by a boss on the handle to establish electrical contact between a tip of the finger and the filler neck before the closure member is moved to open the filler neck.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is an exploded perspective view of a fuel cap in accordance with a first embodiment of the present invention showing a vehicle .fuel tank filler neck made of an electrically conductive material, for closing an open mouth of the filler neck, a pair of conductor pins fixed in the closure member and arranged to extend downwardly toward the filler neck, a conductor ring with two upright tabs above the closure, a torque-transmission race including a straight driven lug and an L-shaped driven lug, and a hollow handle made of an electrically conductive material and including a cover and a pair of integral, downwardly extending drive lugs arranged to engage the upright tabs on the conductor ring to drive the driven lugs on the torque-transmission race so as to establish a lost-motion driving connection between the handle, torque-transmission race, and the closure member;

FIG. 3 is a sectional view taken along line 3—3 of FIG. 2 showing (in solid) a first of the drive lugs on the handle retained in snap-fit relation in a pocket formed in the L-shaped driven lug on the torque-transmission race and a second of the drive lugs on the handle engaging the straight driven lug on the torque-transmission leg and showing (in phantom) movement of the first drive lug on the handle to contact an upright tab on the conductor ring trapped between the first drive lug on the handle and the L-shaped driven lug on the torque-transmission race and movement of the second drive lug to contact another upright tab on the conductor ring trapped between the second drive lug on the handle and the straight drive lug on torque-transmission race so that an electrical charge transferred to conductive handle by a "charged" person gripping the handle will be conducted to ground via the handle, drive lugs, upright tabs, conductor ring, conductor pins, and metal filler neck upon establishing electrical contact of first and second drive lugs on the handle with the upright tabs on the conductor ring;

DETAILED DESCRIPTION OF THE DRAWINGS

Figure 1:
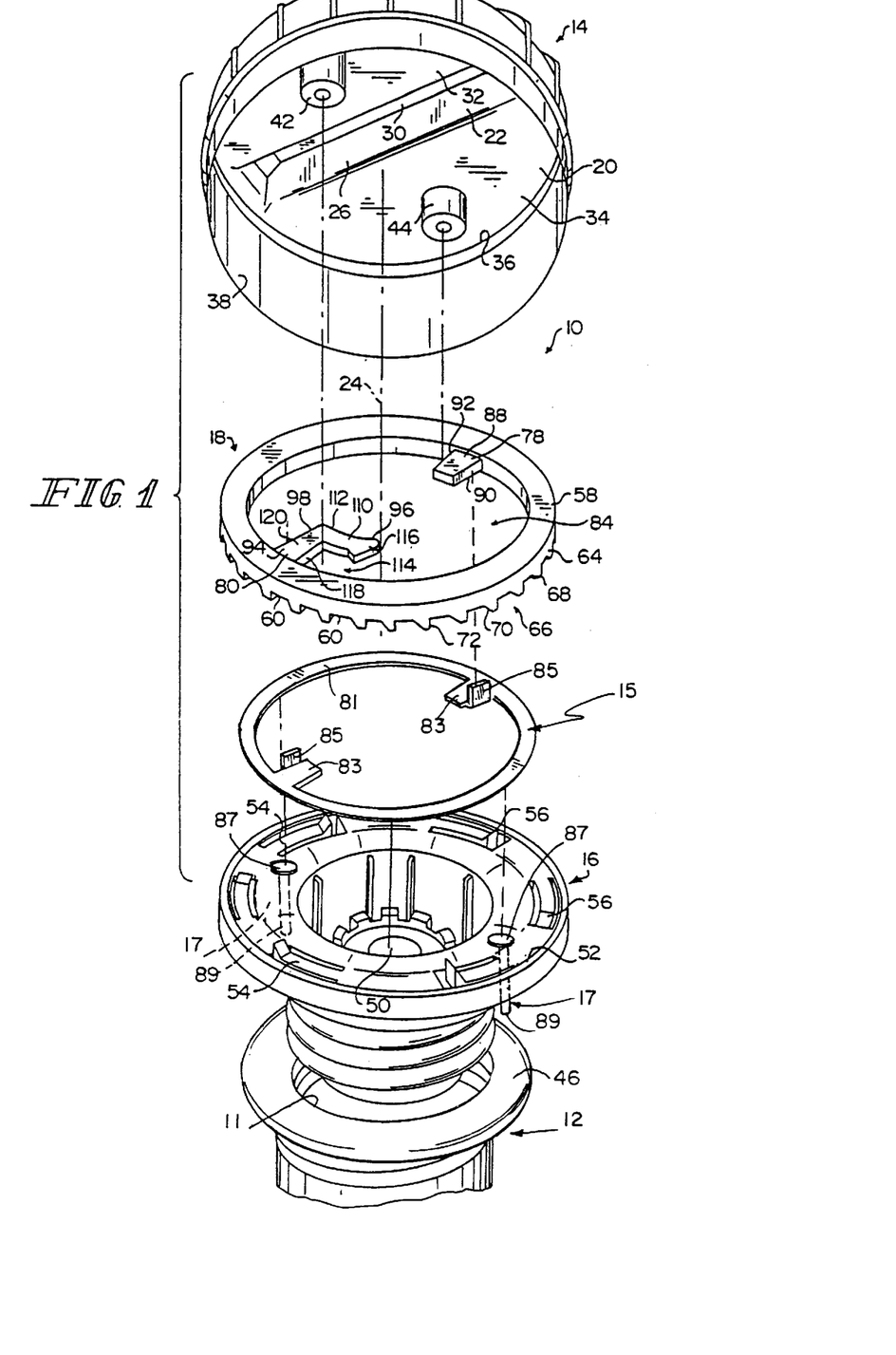
Figure 2:
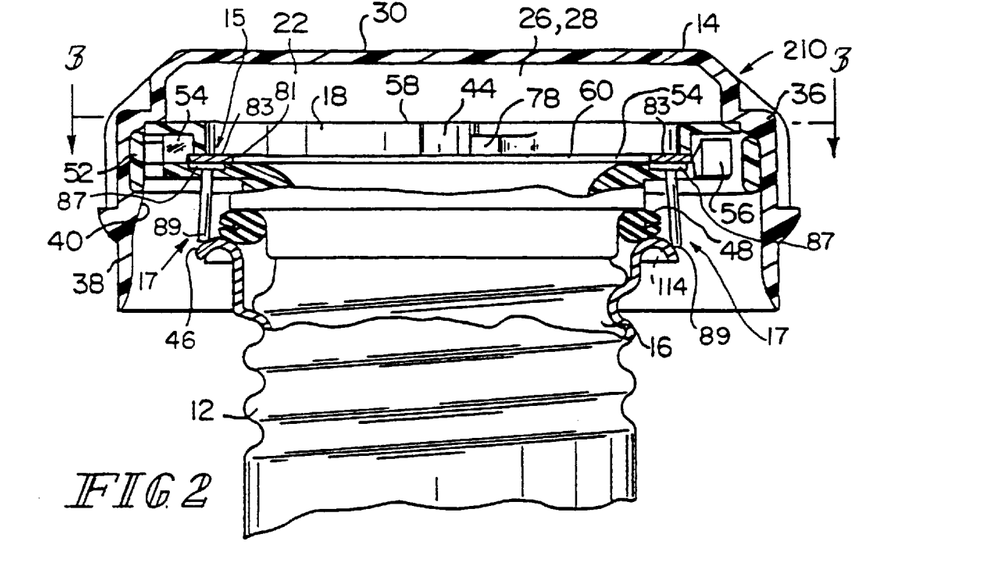
FIG. 2 is a side elevational view of the fuel cap of FIG. 1, with portions broken away, showing the fuel cap of FIG. 1 in a filler neck-closing position on the filler neck trapping and compressing an O-ring member sealing gasket between the closure member and the filler neck.
Figure 3:
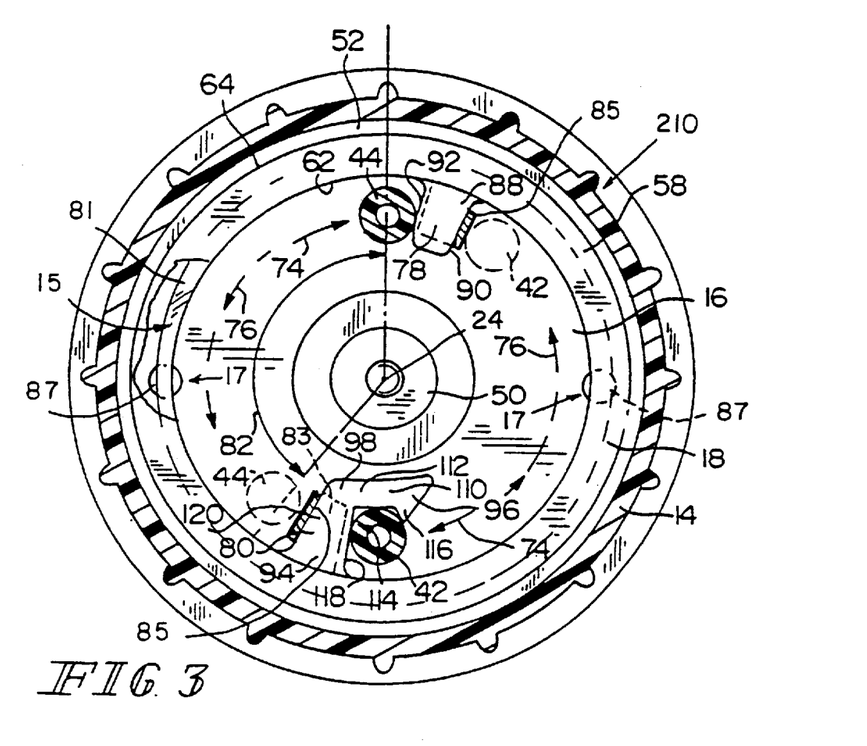

A fuel cap 10 is configured to close and seal an open mouth 11 of a tank filler neck 12. Fuel cap 10 includes lost motion between a handle 14 and filler neck closure member 16 with a grounded connection made between handle 14, conductor, and filler neck 12 during the lost-motion phase of movement of handle 14 relative to filler neck 13 and filler neck closure member 16 so that cap 10 and the operator's hand become fully grounded before the sealed filler neck connection between closure member 16 and filler neck 12 is broken. In the embodiment of FIGS. 1–3, the handle-discharge conductor includes a conductor ring 15 and a pair of conductor pins 17.

Components of a fuel cap 10 for closing a filler neck 12 are illustrated in FIG. 1. Fuel cap 10 includes a shell or handle 14 used to rotate a closure member 16 to close filler neck 12. A torque-transmission race 18 is situated in between handle 14 and closure member 16 to transmit rotation from handle 14 to closure member 16 during installation on or removal from filler neck 12. The disclosure in Robert S. Harris' U. S. Pat. No. 5,449,086 entitled "Delayed Actuation Fuel Cap" is hereby incorporated by reference herein.

Handle 14 includes a top wall or cover 20 with a handle grip 22 formed in top wall 20. Handle grip 22 is used to impart rotational torque to cap 10 about an axis of rotation 24. Handle grip 22 includes upstanding side walls 26 arranged to lie parallel to each other and to extend upward from top wall 20 away from closure 16. Upstanding side walls 26 include a top edge to which an upper wall 30 is appended. Handle grip 22 bisects top wall 20 to create semicircular portions 32, 34.

Top wall 20 includes a perimeter edge 36 and a cylindrical side wall 38 is appended to perimeter edge 36 and arranged to extend downward toward housing 16. Six retaining lugs 40 are appended to cylindrical side wall 38 and function to couple closure member 16, torque-transmission race 18, and handle 14 together.

Drive pins 42, 44 are integrally appended to top wall 20 and extend downwardly from top wall 20 along an axis parallel to the axis of rotation 24. Each drive pin 42, 44 lies in its own semicircular portion 32, 34 so that drive pin 42 is situated in semicircular portion 32 and drive pin 44 is situated in semicircular portion 34. In the illustrated embodiment, drive pins 42, 44 are the ejector pins formed in the plastics molding process to manufacture handle 14. Once handle 14 is ejected from its mold, the ejector pins are cut to a predetermined length to form drive pins 42, 44. The length of drive pins 42, 44 is selected so that drive pins 42, 44 transmit rotation to annular torque transmission ring 18. Drive pins 42, 44 are cylindrical in shape and are hollow due to their function as ejector pins. In alternative embodiments, drive pins 42, 44 may be of a different length and shape and may be appended to handle 14 in a different location or manner.

Closure member 16 is configured to engage a filler neck 12 in a conventional manner. Filler neck 12 is made of an electrically conductive material such as a metal and terminates in an outwardly and downwardly extending sealing lip 46, as shown in FIG. 2. An O-ring sealing gasket 48 is configured to seat against sealing lip 46 and closure member 16 to provide a fluid-tight seal between cap 10 and filler neck 12 when closure member 16 is fully engaged into filler neck 12.

Closure member 16 includes a small electrically conductive probe (e.g., conductor pins 17) extending through the plastic material forming closure member 16 so that the probe is in contact with metal portion 46 of filler neck 12 inside of O-ring gasket 48. When an operator touches cap 10 (e.g., handle 14), the operator immediately makes the conductivity connection with cover 20 which is not grounded; therefore no shock. As the operator turns cover 20 in full contact with cover 20, the operator then grounds cover 20 to metal conductor ring 15 and in turn to filler neck 46 discharging the electrical potential with no sparks and at the same time with cap 10 still sealed to filler neck 12 since cover 20 is in the "lost-motion portion" of the cap 10 travel and the sealed connection between closure member 16 and filler neck 16 at O-ring gasket 48 has not yet been broken.

Referring to FIG. 1, handle 14, conductor ring 15, and conductor pins 17 are each made of an electrically conductive material. When conductive handle 14 contacts conductor ring 15 and conductor ring 15 contacts conductor pins 17, an electrical path is established to conduct static electricity from a user gripping handle 14 to metal filler neck 12 via an electrically conducted path established between handle 14, conductor ring 15, and conductor pins 17. Torque-transmission race 18 and filler neck-engaging housing or body 16 are both made of non-conductive materials.

As shown best in FIG. 1, conductor ring 15 includes an annular member 81 and a pair of radially inwardly extending fingers 83 integrally appended to an inner edge of annular member 81. These somewhat straight fingers 83 extend toward one another as shown, for example, in FIG. 1 and are aligned along a major diameter of annular member 81. An upright tab 85 is appended to one side of each of fingers 83 to face in opposite directions as shown.best in FIG. 1. As will be seen later, at a certain stage during fuel cap removal, the electrically conductive drive lugs 42, 44 appended to cover 20 of electrically conductive handle 14 will engage upright tabs 85 included in conductor ring 15 so that any electrical current will be able to flow through upright tabs 85, fingers 83, annular member 81 to conductor pins 17 by means of electrical contact between flat heads 87 of conductor pins 17 and the underside of annular member 81. In presently preferred embodiments of the present invention, conductor ring 15 is fixed to rotate with torque-transmission race 18 so as to be movable relative to handle 14 and closure member 16.

Referring to FIG. 2, it will be seen that even during positioning of fuel cap 10 in its filler neck-closing position, the underside of annular member 81 of electrically conductive conductor ring 15 is retained in electrical contact and engagement with heads 87 of conductor pins 17. At the same time, the proximal or upper ends of pin shafts 83 are in contact with heads 87 and the distal or lower ends of pin shafts 89 are in electrical contact and engagement with sealing lip 46 of metal filler neck 12.

In FIG. 1, a pressure-vacuum valve assembly 50 is shown for illustrative purposes only in its conventional position disposed in closure 16. Pressure-vacuum valve assembly 50 controls the venting of fuel vapor from the fuel tank when the pressure within the tank reaches a predetermined, super-atmospheric level. Pressure-vacuum valve assembly 50 also controls the venting of air into the fuel tank when the pressure in the tank decreases to a predetermined, subatmospheric level. Pressure-vacuum valve assembly 50 is a conventional unit, and well known to those skilled in the art.

In addition, it will be understood that the novel features of the present invention are unrelated to the function of pressure-vacuum valve assembly 50. Therefore, the inclusion of assembly 50 is shown for illustrative purposes only. Cap 10 of the present invention will function regardless of the inclusion or omission of a pressure-vacuum valve assembly similar to assembly 50.

Closure member 16 includes a radially outwardly extending flange 52 at an axially upper portion of closure member 16. Six peripherally and slightly axially. upwardly extending resilient fingers 54 are attached to flange 52, as shown in FIG. 1. Each of resilient fingers 54 terminates in a pawl tooth 56. As shown in FIG. 2, flange 52 snaps into the assembled position between retaining lugs 40 on cylindrical side wall 38 and annular torque-transmission race 18.

Annular torque-transmission race 18 includes an annular top wall 58, annular bottom wall 60, cylindrical inner edge 62, and a cylindrical outer edge 64. Annular torque-transmission race 18 is situated between handle 14 and closure member 16 and is bounded by cylindrical side wall 38 of handle 14, as shown in FIG. 2. Annular top wall 58 faces top wall 20 of handle 14. Annular bottom wall 60 includes pockets 66 that are formed between spaced-apart teeth 68, as shown in FIG. 1. Each tooth includes an angled face 70 and an upright face 72. Annular bottom wall 60 cooperates with resilient fingers 54, and specifically angled faces 70 of spaced-apart teeth 68 engage pawl teeth 56 to provide a torque-overriding connection of annular torque-transmission race 18 to closure member 16 in a cap-advancing direction 74 to permit advancement of closure member 16 into filler neck 12. The torque-overriding connection prevents overtightening closure member 16 in filler neck 12.

In addition, upright faces 72 of spaced-apart teeth 68 engage pawl teeth 56 to provide a direct connection of annular torque-transmission race 18 to closure member 16 in a cap-removal direction 76 to permit removal of closure member 16 from filler neck 12. The cooperation of resilient fingers 54 and annular torque-transmission race 18 to provide the torque-overriding connection in one direction and the direct connection in the other direction is well known in the art, and is specifically described in U.S. Pat. Nos. 4,280,346 to Evans, the entire specification and disclosure of which is hereby incorporated by reference.

Cylindrical outer edge 64 lies adjacent to cylindrical side wall 38 of handle 14. Cylindrical inner edge 62 is concentric to cylindrical outer edge 64. Driven lugs 78, 80 are appended to cylindrical inner edge 62. Drive pins 42, 44 extend downward from top wall 20 into a region 84 bounded by cylindrical inner edge 62 and engage with driven lugs 78, 80 to transmit rotation from handle 14 to closure member 16 as shown in FIG. 3.

Drive pins 42, 44 and driven lugs 78, 80 also cooperate to provide a delayed actuation driving connection. In the illustrated embodiment, driven lugs 78, 80 are spaced apart 180° to provide approximately 160° of lost motion 82 that drive pins 42, 44 must travel through once they disengage a first driven lug 78 in a first direction and before they engage a second driven lug 80 in a second direction. In alternative embodiments, driven lugs 78, 80 may be spaced apart at any predetermined angular dimension to provide a desired lost motion distance 82.

In the illustrated embodiment, first driven lug 78 is straight and second driven lug 80 is L-shaped. Straight driven lug 78 extends radially inward toward axis of rotation 24 a predetermined distance from a proximal end 88 appended to cylindrical inner edge 62. Straight driven lug 78 includes side walls which extend radially outward toward axis of rotation 24 from proximal end 88 of straight driven lug 78. The side walls include a cap-removal side 90 and a cap-advancing side 92. Straight driven lug 78 is used to engage with a drive pin 42, 44 to transmit rotation from handle 14 to closure member 16. Cap-advancing side 92 "engages" drive pin 44 in a cap-advancing direction 74 and cap-removal side 90 "engages" drive pin 42 in a cap-removal direction 76.

L-shaped driven lug 80 has a proximal end 94 appended to cylindrical inner edge 62 and a distal end 96. L-shaped driven lug 80 includes a first member 98 which extends from proximal end 94 radially outward toward axis of rotation 24 a predetermined distance and a second member 110 which extends from a distal end 112 of first member 98 circumferentially to distal end 96 of L-shaped driven lug 80. L-shaped driven lug 80 is used to engage with a drive pin 42, 44 to transmit rotation from handle 14 to closure member 16 and to create a pocket 114 for holding drive pin 42 during rotation in cap-advancing direction 74. An anti-drift retaining lug 116 is appended to distal end 96 of L-shaped driven lug 80 and extends radially outward from axis of rotation 24 to create a drive pin-retaining pocket 114 for releasably retaining drive pin 42. Drive pin-retaining pocket 114 holds drive pin 42 stationary when cap 10 is in its closed position as shown in FIG. 3. This ensures cap 10 will not lose the 160° of lost motion 82 when cap 10 is in the closed position due to cap drifting or the like.

L-shaped driven lug 80 includes a retaining side 118 and a non-retaining side 120. Retaining side 118 is shaped to define drive pin-retaining pocket 114. When cap 10 is rotated in a cap-removal direction 76, drive pin 42 engages cap-removal side 90 of straight driven lug 78 and drive pin 44 engages non-retaining side 120 of L-shaped driven lug 80. When cap 10 is rotated in a cap-advancing direction 74, drive pin 42 engages retaining side 118 of L-shaped driven lug 80 and drive pin 44 engages cap-advancing side 92 of straight driven lug 80.

In alternative embodiments, any number of drive pins 42, 44 or driven lugs 78, 80 may be used. In alternative embodiments, driven lugs 78, 80 may include any combination of straight driven lugs 78 and L-shaped driven lugs 80.

Assuming that cap 10 is removed from filler neck 12 and an operator (not shown) desires to insert cap 10 into filler neck 12, handle 14 is rotated in cap-advancing direction 74 (clockwise) through lost motion dimension 82 until drive pin 44 engages cap-advancing side 92 of straight driven lug 78 and drive pin 42 engages retaining side 118 of L-shaped driven lug 80. This cap-advancing orientation is shown in FIG. 3. In this position, drive pin 42 is releasably retained in drive pin-retaining pocket 114.

This cap-advancing rotational movement acts to engage closure member 16 in filler neck 12 and rotatably advance closure member 16 toward gasket 48 and sealing lip 46 to seal filler neck 12. The rotational movement of handle 14, annular torque-transmission race 18, and closure member 16 in a cap-advancing direction 74 is continued until closure member 16 is fully engaged in filler neck 12 and gasket 48 is trapped between closure member 16 and filler neck 12. Further rotation of handle 14 in cap-advancing direction 74 results in annular torque-transmission race 18 rotating with respect to closure member 16 due to torque-overriding connection between annular torque-transmission race 18 and closure member 16 as described previously to prevent overtightening of closure member 16.

To remove cap 10 form filler neck 12, the operator begins rotating handle 14 in cap-removal direction 76. Initial rotation of handle 14 in cap-removal direction 76 forces drive pin 42 out of drive pin-retaining pocket 114 without imparting any rotational movement to annular torque-transmission race 18 or closure member 16.

As shown in FIG. 3, a user will turn handle 14 about axis of rotation 24 from the position wherein drive lugs 42, 44 engage driven lugs 78, 80 on torque-transmission race 18 as shown in solid in FIG. 3 to cause those drive lugs 42, 44 to rotate or move in direction 76 to assume a position (shown in phantom in FIG. 3) wherein drive lug 42 engages one of upright tabs 85 on conductor ring 15 and drive lug 44 engages another upright tab 85 on conductor ring 15. Such engagement of drive lugs 42, 44 and upright tabs 85 on conductor ring 15 establish an electrically conductive path between handle 14 and filler neck 12 through non-conductive torque-transmission race 18 and closure member 16.

As illustrated in FIG. 3, handle 14 is rotated approximately 160° before drive pin 42 moves one upright tab 85 to engage cap-removal side 90 of straight driven lug 78 and drive pin 44 moves other upright tab 85 to engage non-retaining side 120 of L-shaped driven lug 80. Continued rotation of handle 14 about axis of rotation 24 in cap-removal direction 76 will impart direct rotational movement to closure member 16 to begin removing closure member 16 from filler neck 12.

Another embodiment of a cap in accordance with the present invention is shown in FIGS. 4–10. Fuel cap 210 includes a handle 14 modified to include two internal bosses 202 on inner side wall 38 as shown, for example, in FIGS. 4 and 6, a torque-transmission race 18, a conductor 204, and a closure member 16. Conductor 204 includes an annular band or base 215 and fingers 217. Bosses 202 formed on handle 14 operate to deflect fingers 217 relative to annular band 215 to contact filler neck 12 so electrical communication is established from handle 14 to filler neck 12 through conductor 204 during rotation of handle 14 relative to closure member 16 and filler neck 12 and before handle 14 turns closure member 16 relative to filler neck 12 to break the seal established between closure member 16 and filler neck 12.

Figure 4:
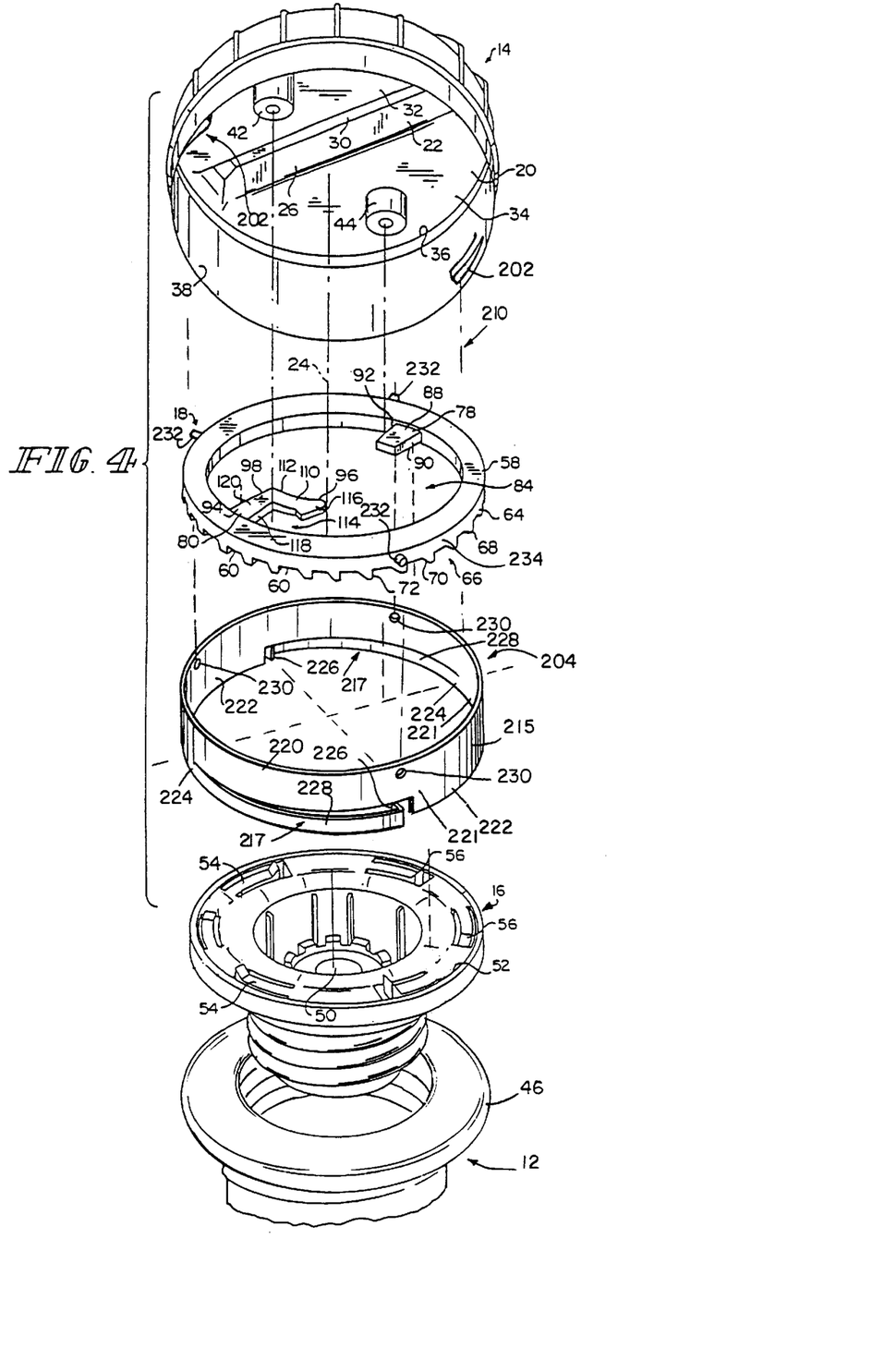
FIG. 4 is an exploded perspective view of a fuel cap in accordance with a second embodiment of the invention showing (from bottom to top) a metal vehicle fuel tank filler neck formed to include an open mouth, a closure member configured to close the open mouth of the filler neck, a conductor ring including an annular band and a pair of deflectable conductor fingers appended to the annular band, a torque-transmission race adapted to carry the conductor ring thereon and a hollow handle made of an electrical conductor and configured to receive the torque-transmission race and conductor ring therein and to couple to the closure member.
Figure 5:
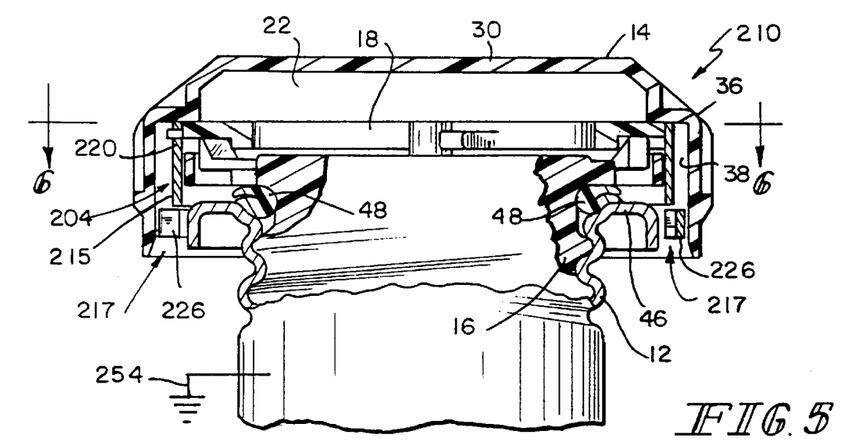
FIG. 5 is a side elevational view of the fuel cap of FIG. 4, with portions broken away, showing the fuel cap in a filler neck-closing position on the filler neck and showing tips on both conductor fingers of the conductor ring positioned to lie in spaced-apart relation from the filler neck.

As shown in FIG. 4, Annular band 215 of conductor 204 includes a ring-shaped axially outer end 220 and an axially inner end 221 formed to include a pair of spaced-apart curved flanges 222. Each finger 217 includes a root 224 appended to one of flanges 222 and a filler neck-contact tip 226 positioned to lie in spaced-apart relation to companion root 224. Each finger 217 also includes a curved body 228 coupled to root 224 and filler neck-contact tip 226. Conductor 204 is made of an electrically conductive, spring material.

Conductor 204 is coupled to torque-transmission race 18 to rotate therewith relative to closure member 16 and filler neck 12. Axially outer end 220 is formed to include apertures 230 that are arranged to receive mounting posts 232 appended to an annular outer wall 234 of torque-transmission race 18 so that conductor 204 is mounted in a fixed position on torque-transmission race 18.

Figure 6:
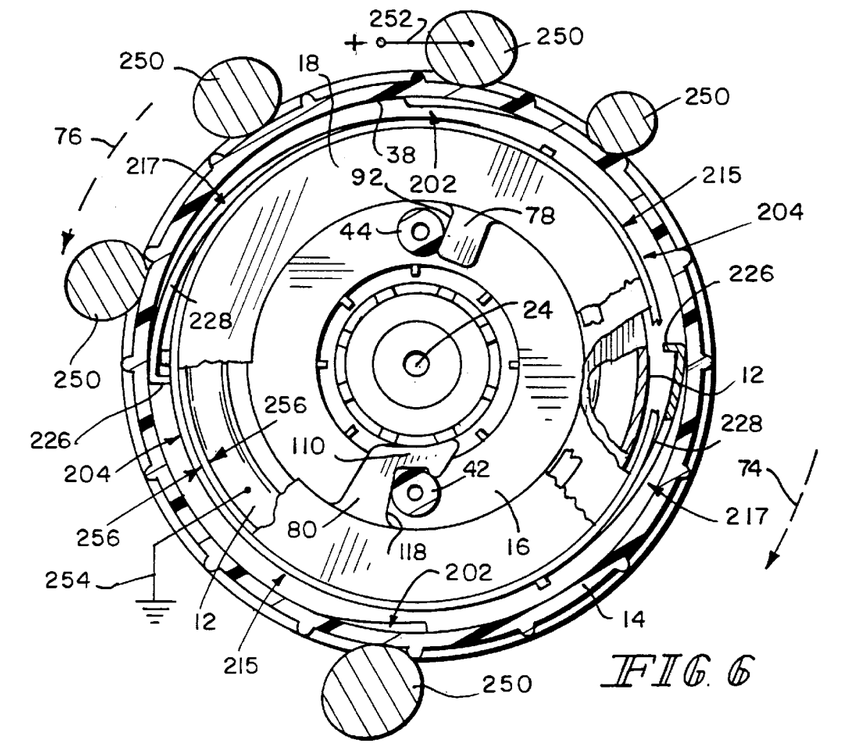
FIG. 6 is a sectional view taken along line 6—6 of FIG. 5, with portions broken away, showing the conductor ring mounted to an annular outer wall of the torque-transmission race and showing portions of the filler neck underneath the torque-transmission race and the spring-biased tips of the two conductor fingers positioned to lie in radially outwardly spaced-apart relation from the annular outer wall of the filler neck at the point when a user grips the handle and begins to turn the handle relative to the closure and filler neck in a counterclockwise cap-removal direction.
Figure 7:
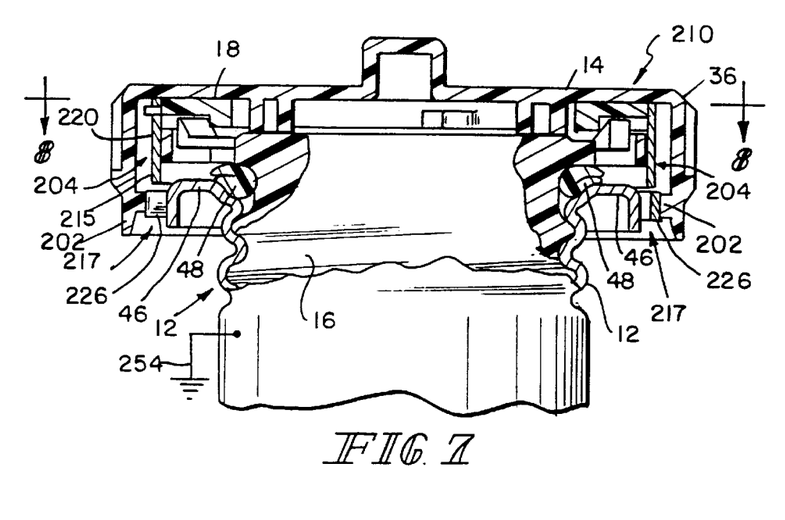
FIG. 7 is a view similar to FIG. 5 showing counterclockwise "lost-motion" rotation of the handle through a 90° angle relative to the closure member and filler neck (without rotation of the torque-transmission race or the closure member) to engage and move the two conductor fingers relative to the filler neck to establish electrical contact with the annular outer wall of the electrically conductive filler neck to "ground" the handle before movement of the closure member relative to the filler neck to "break" the seal at the O-ring gasket between the closure member and the filler neck.
Figure 8:
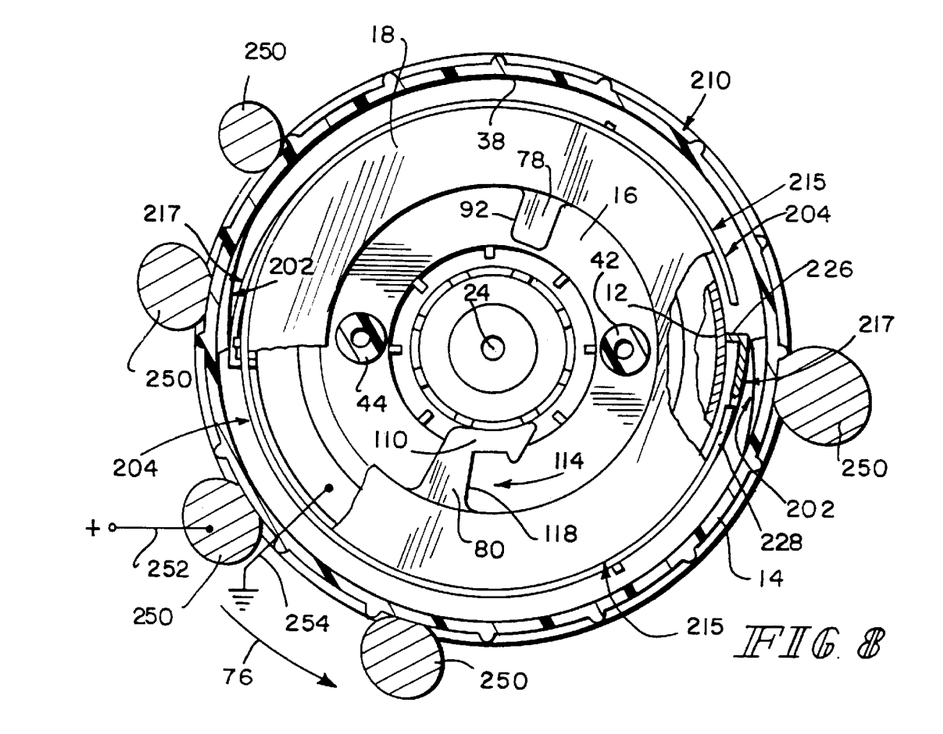
FIG. 8 is a sectional view taken along line 8—8 of FIG. 7, with portions broken away, showing use of internal bosses in the handle to move the spring-biased tips of the conductor fingers radially inwardly to establish electrical contact with the filler neck.
Figure 9:
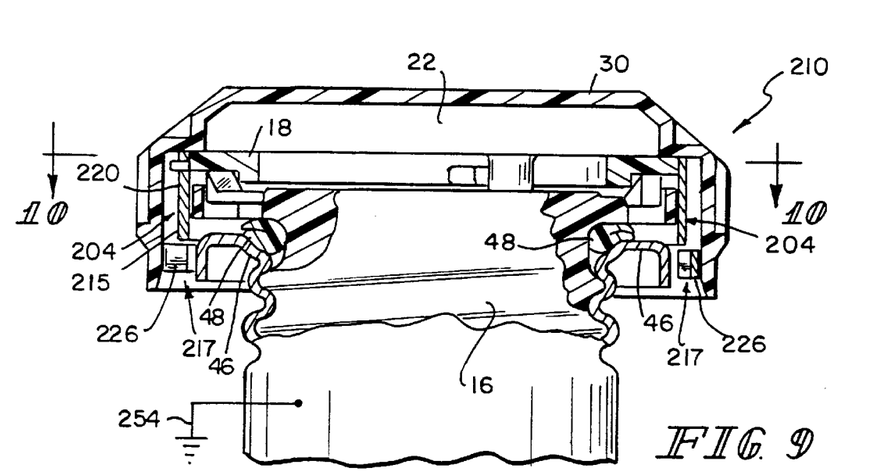
FIG. 9 is a view similar to FIGS. 5 and 7, with portions broken away, showing further counterclockwise lost-motion rotation of the handle through another 90° angle relative to the closure member and filler neck (without rotation of the torque-transmission race or the closure member) to allow the spring-biased conductor finger tips to move radially outwardly (to the positions shown in FIGS. 5 and 6) to disengage the annular outer wall of the filler neck before the seal between the closure member and the filler neck is broken.

Handle 14 includes a pair of bosses 202 arranged to engage curved bodies 228 of fingers 217 during rotation of handle 14 relative to torque-transmission race 18 and closure member 16 through a lost-motion angle as shown, for example, in FIGS. 7 and 8. Bosses 202 urge fingers 217 radially inwardly to cause filler neck-contact tips 226 to engage and establish electrical contact with filler neck 12. Filler neck-contact tips 226 are movable relative to base 215 between non-active positions shown, for example, in FIGS. 5, 6, 9, and 10 away from filler neck 12 to avoid electrical contact with filler neck 12 and active positions shown, for example, in FIGS. 7 and 8 engaging filler neck 12 to establish electrical contact with filler neck 12. Fingers 17 are made of a spring material normally to bias filler neck-contact tips 226 to their active positions until tips 226 are moved temporarily to their active positions during lost-motion rotation of handle 14 relative to closure (e.g., torque-transmission race 18 and closure member 16) of the type that occurs when a user first begins to rotate handle 14 in a cap-removal direction during an initial stage of vehicle refueling.

Assuming that cap 210 is removed from filler neck 12 and an operator 250 desires to insert cap 210 into filler neck 12, handle 14 is rotated in a cap-advancing direction 74 (clockwise) through the lost motion dimension—until drive pin 44 engages cap-advancing side 92 of straight driven lug 78 and drive pin 42 engages retaining side 118 of L-shaped driven lug 80. This cap-advancing orientation is shown in phantom in FIG. 6. In this position, drive pin 42 is releasably retained in drive pin-retaining pocket 114.

The cap-advancing rotational movement acts to engage closure member 16 in filler neck 12 and rotatably advance closure member 16 toward gasket 48 and sealing lip 46 to seal filler neck 12. The rotational movement of handle 14, torque-transmission race 18, and closure member 16 in cap-advancing direction 72 is continued until closure member 16 is fully engaged in filler neck 12 and gasket 48 is trapped between closure member 16 and filler neck 12. Further, rotation of handle 14 in cap-advancing direction 74 results in torque-transmission race 18 rotating with respect to closure member 16 due to torque-overriding connection between torque-transmission race 18 and closure member 16, as previously described.

To remove cap 210 from filler neck 12, operation 250 rotates handle 14 in a cap-removal direction 76, as shown in FIG. 6. Initial rotation of handle 14 in cap-removal direction 76 forces drive pin 42 out of drive pin-retaining pocket 114 without imparting rotational movement to torque-transmission race 18 or closure member 16. Additionally, fingers 217 of conductor 204 are spaced apart from filler neck 12 a pre-determine distance 256.

Figure 10:
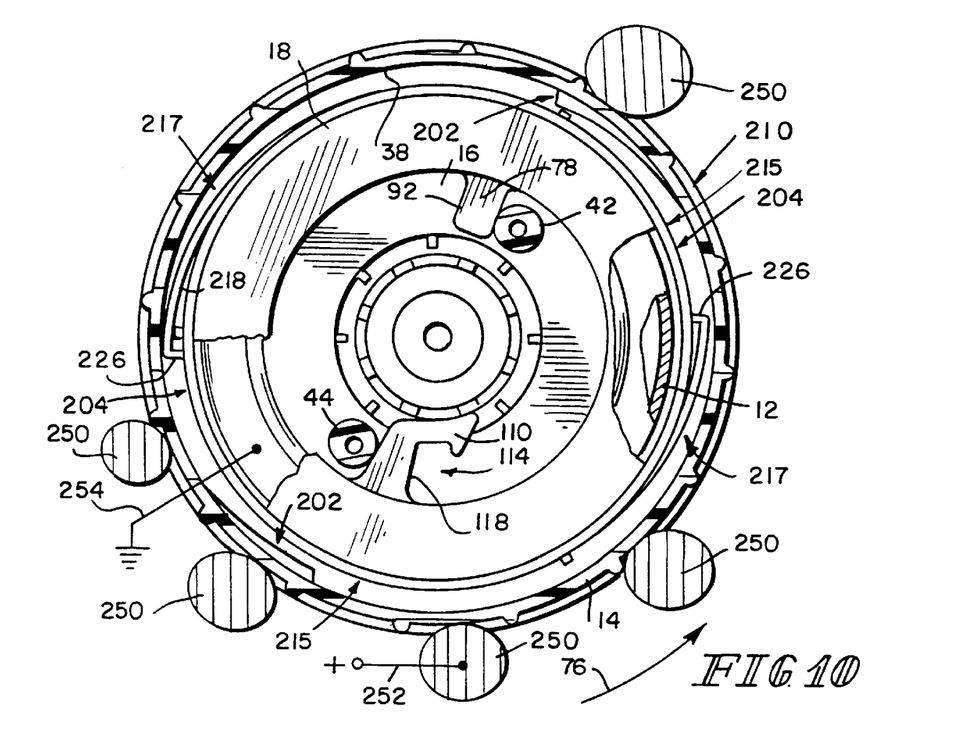
FIG. 10 is a sectional view taken along line 10—10 of FIG. 9, with portions broken away, showing the result of radially outward movement of the conductor finger tips away from the filler neck and engagement of two drive lugs on the underside of the handle with L-shaped and straight driven lugs on the torque-transmission race so that continued counterclockwise rotation of the handle relative to the filler neck in the cap-removal direction will cause the torque-transmission race and the closure member to rotate together relative to the filler neck to break the seal at the O-ring gasket between the closure member and the filler neck.

Referring now to FIG. 8, as operator 250 continues to turn handle 14 about axis of rotation 24 in direction 76, bosses 202 of handle 14 engage fingers 217 of conductor 204 and urge fingers 217 radially inwardly toward filler neck 12 causing neck-contact tips 226 to engage filler neck 12. When conductive handle 14 presses conductor 204 into engagement with filler neck 12, an electrical path is established to conduct static electricity 252 from user 250 gripping handle 14 to metal filler neck 12 and thus ground 254 via an electrically conductive path established between handle 14, conductor 204, and filler neck 12. Continued lost-motion rotation of handle 14 relative to closure ember 16 and filler neck 12 causes bosses 202 to pass over fingers 217 of conductor 204, as shown in FIG. 10. Thus, bosses 202 allow fingers to disengage filler neck 12 before the seal between filler neck 12 and closure member 16 is broken.

Figure 11:
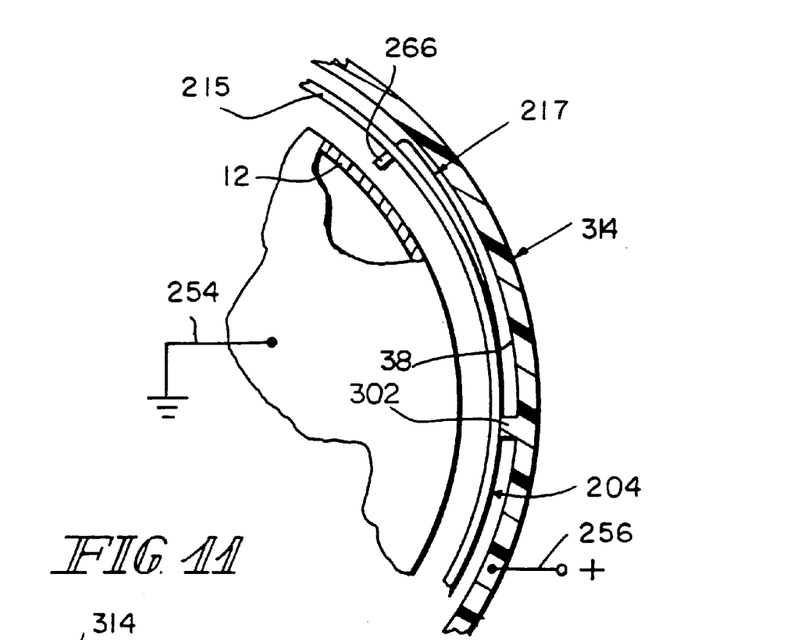
FIG. 11 is a view of a portion of a fuel cap in accordance with a third embodiment of the invention showing another style of conductor finger tip-moving boss appended to an inner wall of a fuel cap handle.
Figure 12:
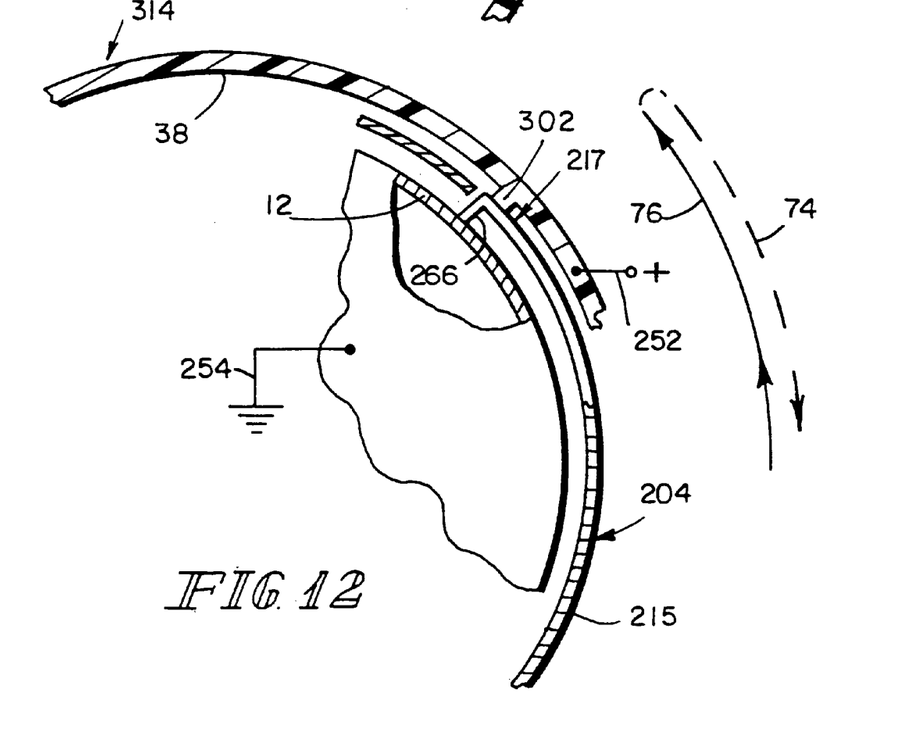
FIG. 12 is a view similar to FIG. 11 showing use of the boss to move the conductor finger tip in a radially inward direction to establish electrical contact with the annular outer wall of the filler neck.

An alternative handle 314 suitable for use with fuel cap 210 in accordance with the present invention is illustrated in FIGS. 11 and 12. Handle 314 is formed similarly to handle 14 and like reference numerals are used to denote like components. Handle 314 is modified to include two internal bosses 302 on inner side wall 38. When fuel cap 210 is coupled to filler neck 12 fingers 217 of conductor 204 are spaced apart from filler neck 12 as shown in FIG. 11. Initial rotation of handle 314 in cap-removal direction 76 rotates bosses 302 of handle 314 into engagement with fingers 217 off conductor 204. Bosses 302 urge fingers 217 radially inwardly toward filler neck 12 causing neck-contact tips 226 to engage filler neck 12, as shown in FIG. 12. When conductive handle 314 presses conductor 204 into engagement with filler neck 12, an electrical path is established to conduct static electricity 252 from the user gripping handle 314 to metal filler neck 12 and thus ground 254 via an electrically conductive path established between handle 314, conductor 204, and filler neck 12. Continued lost-motion rotation of handle 14 relative to closure ember 16 and filler neck 12 causes bosses 302 to pass over fingers 217 of conductor 204. Thus, bosses 302 allow fingers to disengage filler neck 12 before the seal between filler neck 12 and closure member 16 is broken.

Although this invention has been described in detail with reference to certain embodiments, variations and modifications exist within the scope and spirit of the invention as described and defined in the following claims.

What is claimed is:

1. Apparatus comprising
a tank filler neck having an inlet, the tank filler neck being made of an electrically conductive material,
a closure coupled to the tank filler neck to close the inlet,
a handle made of electrically conductive material, the handle being supported for rotation in a first direction about an axis of rotation through a lost-motion angle relative to the closure and filler neck to engage the closure so that the closure is rotated about the axis of rotation in response to further rotation of the handle relative to the filler neck in the first direction, and
a conductor coupled to the closure and arranged to establish an electrical connection between the handle and the filler neck to dissipate an electrical charge applied to the handle by a user during rotation of the handle in the first direction through the lost-motion angle relative to the closure.

2. The apparatus of claim 1, wherein the conductor includes a base coupled to the closure, a filler neck-contact tip movable relative to the base between a non-active position away from the filler neck to avoid electrical contact with the filler neck and an active position engaging the filler neck to establish electrical contact with the filler neck, and a spring body coupled to the base and filler neck-contact tip and configured to yieldably bias the filler neck-contact tip normally to the inactive position.

3. The apparatus of claim 2, wherein the handle includes a shell providing a hand grip and means on the shell for urging the spring body toward the filler neck to move the filler neck-contact tip to the active position during rotation of the handle relative to the closure through the lost-motion angle.

4. The apparatus of claim 2, wherein the handle includes an inner wall facing the conductor and a boss located on the inner wall and arranged to engage the spring body to move the filler neck-contact tip to the active position during rotation of the handle relative to the closure through the lost-motion angle.

5. The apparatus of claim 1, wherein the conductor includes a base coupled to the closure and a finger movable relative to the base between a non-active position away from the filler neck to avoid electrical contact with the filler neck and an active position engaging the filler neck to establish electrical contact with the filler neck.

6. The apparatus of claim 5, wherein the base includes an axially outer end facing toward the handle and an axially inner end facing toward the filler neck and the finger includes a root appended to the axially inner end and a filler neck-contact tip spaced apart from the root and movable relative to the base to engage the filler neck upon movement of the finger to the active position.

7. The apparatus of claim 5, wherein the closure includes an annular outer wall and the base includes an annular inner wall surrounding the annular outer wall of the closure.

8. The apparatus of claim 7, wherein the base includes an axially outer end facing toward the handle and an axially inner end facing toward the filler neck and the finger includes a root appended to the axially inner end and a filler neck-contact tip spaced apart from the root and movable relative to the base to engage the filler neck upon movement of the finger to the active position.

9. The apparatus of claim 7, wherein the closure further includes a plurality of mounting posts appended to the annular outer wall and the base is formed to include apertures receiving the mounting posts therein to mount the base of the conductor in a fixed position on the closure.

10. The apparatus of claim 5, wherein the closure includes a closure member engaged to the tank filler neck and a rotatable torque-transmission race positioned to lie between the handle and the closure member and configured to provide a lost-motion driving connection between the handle and the closure member and the base is coupled to the torque-transmission race for rotation therewith.

11. The apparatus of claim 10, wherein the closure further includes a plurality of mounting posts appended to the torque-transmission race and the base is formed to include apertures receiving the mounting posts therein to mount the base of the conductor in a fixed position on the torque-transmission race.

12. The apparatus of claim 10, wherein the torque-transmission race includes an annular outer wall and the base includes an annular inner wall surrounding the annular outer wall of the torque-transmission race.

13. The apparatus of claim 10, wherein the base includes an axially outer end coupled to the torque-transmission race for rotation therewith and an axially inner end surrounding the closure member and a portion of the filler neck for movement relative thereto and the finger includes a root appended to the axially inner end of the base and a filler neck-contact tip spaced apart from the root and movable relative to the base to engage the filler neck upon movement of the finger to the active position.

14. Apparatus comprising
a tank filler neck having an inlet, the tank filler neck being made of an electrically conductive material,
a closure member coupled to the tank filler neck to close the inlet,
a handle made of electrically conductive material,
delayed actuation means for providing a lost-motion driving connection between the handle and the closure member, the delayed actuation means including a torque-transmission race coupled to the closure member and positioned to lie in the handle, and
a conductor coupled to the torque-transmission race to rotate therewith and arranged to establish electrical contact with the filler neck during rotation of the handle relative to the closure member.

15. The apparatus of claim 14, wherein the closure includes an annular outer wall and the conductor includes an annular wall surrounding the annular outer wall of the closure.

16. The apparatus of claim 15, wherein the closure further includes a plurality of mounting posts appended to the annular outer wall and the conductor is formed to include a base having apertures receiving the mounting posts.

17. The apparatus of claim 14, wherein the conductor includes a base coupled to the torque-transmission race and a finger movable relative to the base between a non-active position away from the filler neck to avoid electrical contact with the filler neck and an active position engaging the filler neck to establish electrical contact with the filler neck.

18. The apparatus of claim 17, wherein the base includes an axially outer end facing toward the handle and an axially inner end facing toward the filler neck and the finger includes a root appended to the axially inner end and a filler neck-contact tip spaced apart from the root and movable relative to the base to engage the filler neck upon movement of the finger to the active position.

19. The apparatus of claim 14, wherein the conductor includes a base having an axially outer end coupled to the torque-transmission race for rotation therewith and an axially inner end surrounding the closure member and a portion of the filler neck for movement relative thereto.

20. The apparatus of claim 19, wherein the closure member further includes a plurality of mounting posts appended to the torque-transmission race and the base is formed to include apertures receiving the mounting posts therein to mount the base of the conductor in a fixed position on the torque-transmission race.

21. The apparatus of claim 19, wherein the conductor further includes a finger movable relative to the base between a non-active position away from the filler neck and an active position engaging the filler neck to establish electrical contact with the filler neck.

22. The apparatus of claim 21, wherein the finger has a root appended to the axially inner end of the base and a filler neck-contact tip spaced apart from the root and movable relative to the base to engage the filler neck upon movement of the finger to the active position.

23. An apparatus comprising
a tank filler neck having an inlet, the tank filler neck being made of an electrically conductive material,
a closure member coupled to the tank filler neck to close the inlet, the closure member including an outer wall and a flange extending from the outer wall,
a handle made of electrically conductive material,
a torque-transmission race positioned to lie in the handle, and
a conductor including a conductor ring positioned to lie between the torque-transmission race and the flange of the closure member and a conductor pin extending through the flange of the closure member into engagement with the filler neck, the conductor ring having a radially extending finger and a tab appended to the finger, the tab engaging the torque-transmission race for rotation of the conductor ring with the torque-transmission race to move the finger between a non-active position away from the conductor pin and an active position engaging the conductor pin to establish electrical contact with the filler neck.

24. The apparatus of claim 23, wherein the conductor includes two conductor pins and two fingers.

25. An apparatus comprising
a tank filler neck having an inlet, the tank filler neck being made of an electrically conductive material,
a closure coupled to the tank filler neck to close the inlet,
a handle made of electrically conductive material and supported for movement relative to the closure, and
a conductor arranged to establish an electrical connection between the handle and the filler neck upon movement of the handle to a predetermined position relative to the closure.

26. The apparatus of claim 25, wherein the conductor is coupled to the closure and arranged to establish the electrical connection to dissipate an electrical charge applied to the handle by a user upon movement of the handle relative to the closure to the predetermined position.

27. The apparatus of claim 26, wherein the closure includes a closure member engaged to the tank filler neck and a rotatable torque-transmission race configured to provide a lost-motion driving connection between the handle and the closure member and the conductor is coupled to the torque-transmission race for rotation therewith.

28. The apparatus of claim 27, wherein the conductor includes a base coupled to the closure member and a finger movable relative to the base between a non-active position away from the filler neck to avoid electrical contact with the filler neck and an active position engaging the filler neck to establish electrical contact with the filler neck.

29. The apparatus of claim 25, wherein the conductor includes a first part fixed to the closure and arranged to engage the filler neck and a second part arranged to lie between the handle and closure and move relative to the closure and configured to engage the first part to establish the electrical connection to dissipate an electrical charge applied to the handle by a user upon movement of the handle relative to the closure to the predetermined position.

30. The apparatus of claim 29, wherein the closure includes a closure member engaged to the tank filler neck and a rotatable torque-transmission race configured to provide a lost-motion driving connection between the handle and the closure member and the first part of the conductor is coupled to the closure member.

31. The apparatus of claim 29, wherein the second part includes a tab arranged to contact the handle upon movement of the handle to the predetermined position and a ring arranged to contact the first part during movement of the conductor relative to the closure.

* * * * *